United States Patent [19]
Chen

[11] Patent Number: 5,528,675
[45] Date of Patent: Jun. 18, 1996

[54] NETWORK INTERFACE UNIT

[76] Inventor: Abraham Y. Chen, 2035 Tripiano Ct., Mountain View, Calif. 94040-3870

[21] Appl. No.: 391,099

[22] Filed: Feb. 21, 1995

Related U.S. Application Data

[63] Continuation of Ser. No. 231,291, Apr. 22, 1994, abandoned.

[51] Int. Cl.$^6$ .................................................. H04M 11/00
[52] U.S. Cl. ........................ 379/106; 379/201; 379/107; 379/382; 379/441
[58] Field of Search ............................ 379/67, 106, 107, 379/84, 157, 221, 212, 233, 269, 379, 201, 207, 387, 196, 197, 198, 382, 441

[56] References Cited

U.S. PATENT DOCUMENTS

| | | | |
|---|---|---|---|
| 4,710,919 | 12/1987 | Oliver et al. | 379/107 |
| 4,752,950 | 6/1988 | Le Carpentier | 379/106 |
| 4,833,618 | 5/1989 | Verma et al. | 379/107 |
| 4,924,500 | 5/1990 | Lewis et al. | 379/207 |
| 5,010,568 | 4/1991 | Merriam et al. | 379/107 |
| 5,022,069 | 6/1991 | Chen | 379/67 |
| 5,040,209 | 8/1991 | Greenberg et al. | 379/387 |
| 5,202,916 | 4/1993 | Oliver | 379/107 |
| 5,204,896 | 4/1993 | Oliver | 379/107 |
| 5,311,581 | 5/1994 | Merriam et al. | 379/107 |

Primary Examiner—Jeffery Hofsass
Assistant Examiner—Scott Wolinsky

[57] ABSTRACT

A Network Interface Unit (NIU) for serving a central office line and one or more local stations by interfacing remotely monitored devices, such as utility controllers and meter readers, to an existing customer telephone line that serves the customer site. The NIU comprises a master switching unit having a central office port, a main port connected to one or more telephone sets on the customer premises, and at least one station port assigned a calling identity and connected to a remotely monitored or controlled device. The NIU also comprises a controller for establishing "standby" and "armed" states in response to any one of a plurality of predefined sequences of normal power ringing signals. After receipt of a predefined sequence of normal power ringing signals, the NIU is "armed" such that it is capable of receiving a Telemetry and Remote Control call from Telemetry And Control (TAC) hub equipment and, if the call is received within a predefined period of time, enabling two-way communication between the TAC hub equipment and the remote device.

3 Claims, 7 Drawing Sheets

NETWORK INTERFACE UNIT

This application is a continuation of application Ser. No. 08/231,291, filed Apr. 22, 1994, now abandoned.

BACKGROUND OF THE INVENTION

1. Technical Field

This invention relates to telemetry and remote control techniques on a mass-deployed scale, in particular, by sharing the use of subscriber loops of the switched telephone network in a "background" mode for communication services that do not need the participation of the subscribers.

2. Description of the Related Art

In establishing a communication link between two parties, alerting signals are first initiated by the originating party. Once the receiving party responds, some kind of handshaking processes take place to identify, greet and synchronize the two parties before the actual information exchanges start. Depending on the complexity of a system involved, this process could be very simple, or very complicated, and is generally referred to as "communication protocol".

When a communication facility is set up by a third-party service provider, the protocol becomes much more rigorous because of the need to protect the privacy between the two communicating parties as well as to assure the proper financial reward to the service provider. One classical service provider is the switched telephone network. A telephone switch applies, based on the destination information given by the originating ("calling") subscriber, ringing signals toward the receiving instrument. Upon answering by the subscriber at the termination (the "called" party), a connection is established. Traditionally, the telephone company charges the calling party for the duration when the connection is maintained, that is, from the moment that the called party answers the call to the instant that the connection is taken down. Based on this rule, it is clear that, for the interest of the telephone company, it is important to prohibit information exchange between the two end subscribers until a definitive "answer" event is established.

This communication protocol has worked well in providing the conventional telephony services which has been evolved into the largest communications network currently in existence—the Public Switched Telephone Network (PSTN). However, because the fundamental goal of the telephone service provider is to make the called subscriber answer the phone, ringing is always the first signal that arrives at the called subscriber's instrument. Even with the latest enhanced calling service feature—the Caller IDentification, signals that identify the caller are sent toward the called instrument during the silent period of the ringing cycles. Therefore, in the existing PSTN which is originally intended for voice communication services, bell ringing is always the first indication of an incoming call, regardless of the type of the caller.

The question is, "Can the ringing be suppressed for certain types of calls that are destined for an instrument, not a human being, so that the subscriber will not be disturbed?" With the majority of the subscriber loops idle most of the time, this capability would open up the possibilities of utilizing these resources for new communications that do not need subscribers' involvement.

Nevertheless, there is a stumbling block that stands in the way. Because the PSTN is a well established facility, attempts to modify its existing operation procedures, such as the call setup protocol, should meet great resistance and difficulties, if not an impossibility. So, the next question should be: "What can be done to achieve a connection with a call which will not sound the ringer in the terminating instruments, even though every call actually is preceded with the ringing signals?"

With the deep penetration of the PSTN into almost every corner of the modern society, the potential of such a capability which would provide communications between data instruments in addition to traditional voice calls between human subscribers, hereof named as Telemetry and Remote Control (TRC), can be enormous.

One special example of the TRC applications is the simple one-to-one communications between data type instruments such as computer modems and facsimile transmission equipments over the telephone line originally set up for simple voice calls. A commercially available device, generally referred to as the "FAX Switch", has been able to distinguish a FAX or modem call from a voice call by recognizing special pilot tones emitted by the calling FAX or modem. However, it is a specific solution for a specific type of equipment and it actually has to perform this discrimination function only after answering to the ringing signal. Thus, without choice, any call made to a line with this type of instruments would always pay extra fee to the telephone company for the duration of screening and routing the call after answering without being alerted to such a fact.

The technique disclosed in this invention is of a generic nature that it can not only replace the need of a dedicated equipment such as the FAX switch but also avoid causing the ordinary caller to pay extra fee.

Another example of TRC is the utility meter reading and load distribution control. In this case, the configuration is a network connecting several parties (different utility companies) to many parties (the mass customers) with each communication session being a one-to-one connection. Thus, a general connection scheme is required.

The utility companies have long been facing the cost, convenience, frequency and accuracy issues of meter reading. Methods of meter reading that are non-interfering to the customer, yet capable of maintaining an accurate and cost-effective operation, have been sought for during the past two decades. Various techniques have been in trials. These range from power line data transmission to radio link polling. Each approach has its special characteristics and limitations. None of them seems to meet all those issues that started this new field, commonly known as Automatic Meter Reading (AMR).

While AMR is originated from utility companies' interests in cutting cost, the long term implication of this effort is actually far more reaching. For example, one of the possible AMR technology applications is the management of commercial electrical power for reducing peak hour loads. Although there have been different rates to encourage off-peak-hour use of electricity for non-essential power consumption, implementations to take such an advantage have been very limited. This is because the physical control has to be implemented and maintained by the individual customers. If this responsibility can be shifted to a central facility under the utility company's control, there will be no need to train the customers for proper operation of the controls or to audit the compliances.

At this moment, the PSTN is the only natural candidate as the backbone to AMR applications. It possesses several essential ingredients which are crucial to the success of AMR. For example, it has reached almost any location where there is consumption of public utilities; it is capable of providing two-way communications at reasonable speeds with affordable cost; it has a unique characteristic of having the utility meters already correlated with the customers' telephone numbers by virtue of the business account records, avoiding the potential complexities in setting up new databases commonly associated with other techniques. Furthermore, this facility is constantly maintained by a regulated utility, the telephone company, to an established performance standard, thus simplifying much of the AMR operation procedures.

AMR has been utilizing PSTN for quite a few years, However, there is still an inherent limitation on using the telephone line for this purpose. Although a dedicated line would serve this purpose well, it is not economically practical. Thus, the AMR application has to be content with sharing the telephone line already existing on the customer premises. Since the telephone company central office automatically applies ringing signals to sound the bells in the telephone sets on every call without any distinction between the AMR or ordinary voice calls, the subscribers will be disturbed each time a utility company attempts to read the meter via the shared telephone line. This has been the obstacle that prevented a full acceptance of using the PSTN for the AMR application.

Initially, utility companies installed electronic readers at the customer sites that were set up to call in to the central equipment for reporting meter readings, thus the term "Inbound". This required each individual reader to have a certain level of sophistications such as automatic retrials upon encountering difficulties in contacting the central equipment, an electronic calendar clock to assure on-time reporting plus backup batteries to maintain its continuity in case of commercial power failures. In recent years, techniques have been developed such that utility companies can call out from a central equipment to poll the individual meters at any time, thus the term "Outbound". However, to avoid disturbing the customer during the meter reading sessions, the normal ringing signal has to be suppressed. One possible technique was disclosed in U.S. Pat. No. 5,010,568 issued to Merriam et al. on Apr. 23, 1991. Technically speaking, this method utilizes the "test trunk", sometimes referred to as "no ring trunk" facility of the telephone company central office that is originally equipped to support telephone maintenance and repair activities.

While such an approach is technically sound, it requires the telephone company to provide this capability by increasing the capacity of the test trunks as well as customizing the operating procedures for the calls originated by a meter reading equipment. Thus, this approach puts AMR at the mercy of the local telephone companies who may not be willing to cooperate. Besides, it will definitely cost the utility companies up-front investment capitals to set this facility up at each central office where there might be an AMR type of application, even if the telephone company goes along.

The communication protocol disclosed below allows the outbound AMR tasks be conducted in such a way that it follows the conventional telephone call procedures as well as utilizes only the existing network facilities. Consequently, the telephone company will not be required to provide any special support. Without telephone company's direct involvement, not only the initial capital investment cost is avoided but also allows the AMR service to be available to any isolated customers without geographical constraints.

It should be emphasized here that although the technique disclosed in this invention allows the practice of TRC through PSTN without ever involving the telephone company directly, the telephone company still benefits from this by having more completed calls than otherwise possible before the TRC is in service.

SUMMARY OF THE INVENTION

This document discloses a novel technique that utilizes a new communication protocol such that a remote terminal, which shares a telephone line originally serving only regular telephone sets on the premises, can be accessed by a central equipment making outbound telephone calls through the PSTN. With the alerting bell sounds associated with the ringing signals sent out by the telephone central office suppressed with a special interface module at the customer's site, a TRC call is then distinguished from an ordinary voice call. Thus, the subscriber will not be disturbed by the TRC calls.

In accordance with my invention, the only special equipment needed at customer site would be a specially designed Network Interface Unit (NIU). The NIU interfaces the utility controllers and meter readers to the existing telephone line that serves the site. The equipment needed at the central site which performs the Telemetry And Control (TAC) functions, consists of conventional electronics devices such as telephone modems controlled by a computer. There is nothing in the PSTN itself that need be modified or added.

The invention disclosed here prescribes how a novel communication protocol can establish an outbound connection from the TAC equipment to the NIU in such a way that the PSTN will regard the processes as ordinary calls. However, with a special circuit arrangement in the NIU, the telephone sets on the customer premises will not produce alerting sounds. On the other hand, ordinary callers will hardly notice any changes of the operational characteristics with the NIU installed.

One of the key techniques employed in the current invention is discovered in practicing U.S. Pat. No. 5,022,069 issued to Chen on Jun. 4, 1991. It has a logic arrangement whereby an automated attendant capability is designed as an integral part of a very small PABX. The ability to greet a call and then route it to a destination specified by the calling party, without any human intervention at the terminating end of the connection even on a single line service, leads to the possibility of formulating an NIU at the customer site that can exchange information with the calling party to establish two distinctive types of connections, one for the ordinary voice calls, the other for the TRC type of applications.

The advantage of the present invention is that with proper protocol, the TRC event is distinguished from the normal calls. Thus, the TRC calls do not disturb the subscribers because the NIU intercepts the ringing signals from the central office. On the other hand, the NIU process will let an ordinary call go through without noticeable intervention.

Advantageously, the techniques of my invention may be applied to many situations that can make the best use of the centralized expertise while the actual applications are remote and geographically dispersed. For example, the off-peak-hour power consumption control directly administered by utility companies mentioned above immediately becomes a reality. Remote monitoring for human health as well as major appliance performance or even automobile conditions at individual residences by experts at central location are other possible candidates. Another prospective application is the status report and configuration update of privately-owned pay telephones. An outbound payphone polling process which follows my invention would not be intercepted by people standing nearby since there is no alerting bell sound to attract their attention.

The technique disclosed here opens up a two-way communication for telemetry and control between a central facility and many remote sites at any time desired. More importantly, most of the immediate TRC type applications can be performed during late night through early morning hours when there is practically no ordinary telephone traffic. Thus, the telephone company can derive extra revenue from the TRC activities without investing any new facilities. Yet another benefit of the current invention is to provide ODDC between any two subscribers, each is equipped with combined capabilities of the TAC and the NIU.

DESCRIPTION OF THE PREFERRED EMBODIMENT

Figure 1:
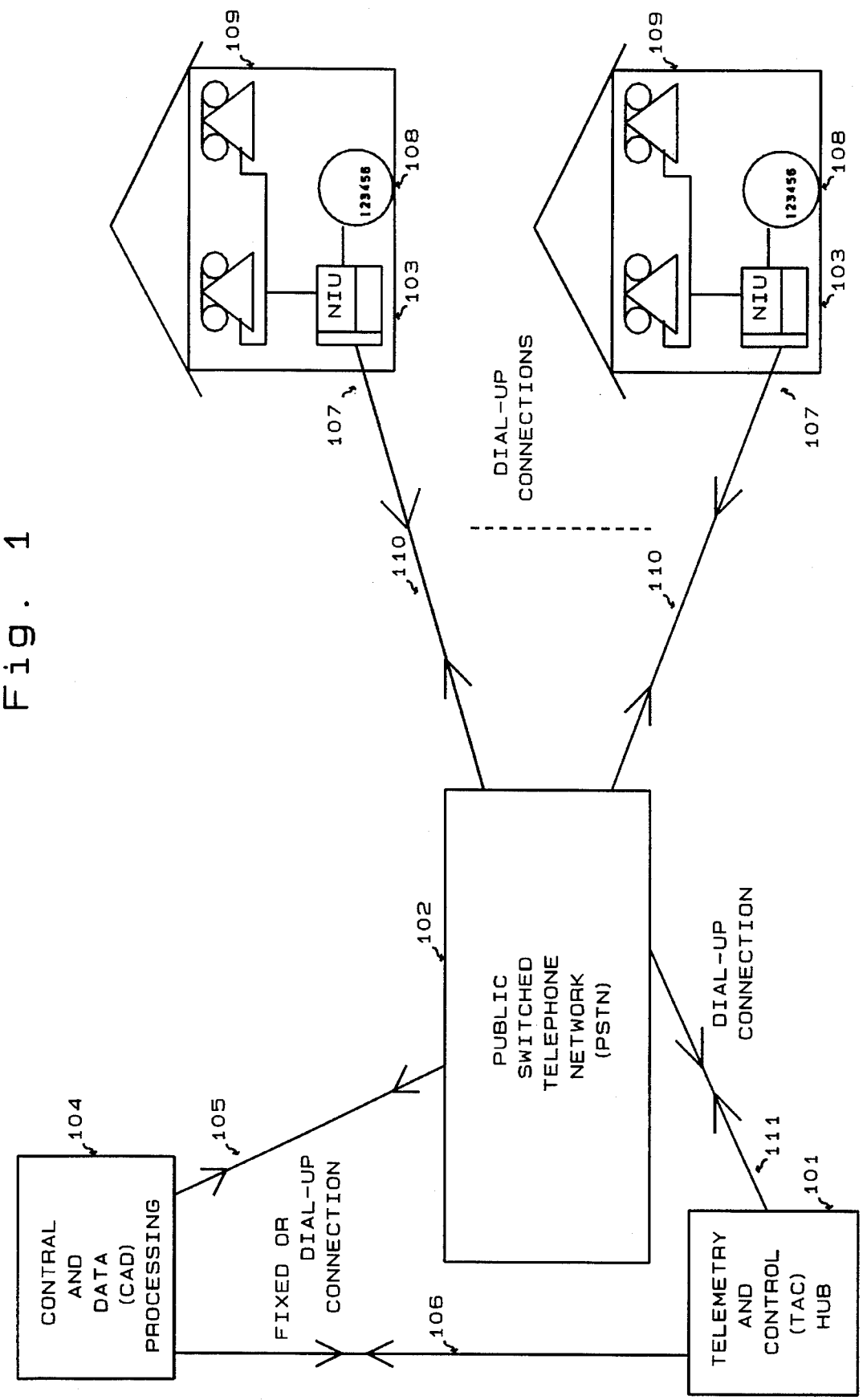
FIG. 1 is the system configuration of my invention, consisting of the Telemetry And Control (TAC) 101 hub equipment, the well-established Public Switched Telephone Network (PSTN) 102 in it's traditional configuration and the Network Interface Unit (NIU) 103 at the customer premises. Note that there may be multiple TAC's depending on the capability of each TAC equipment relative to the total number of customer sites in the field. There may be another layer or two of communication links 105 between the TAC's and the Control And Data (CAD) 104 processing equipment of the utility company. Since the latter links can be dedicated subscriber lines 106, they may be set up in accordance with the conventional manner without relying on the techniques disclosed here.

FIG. 1 presents the system layout of the current invention:

At the telephone service entry (demarcation) point 107, a special control unit, the Network Interface Unit (NIU) 103 is to be installed. It interfaces the original on-premises wiring for telephone instruments 109, electronic controllers and utility meters 108 to the subscriber loop 110 from the telephone company's local central office, which is the perimeter portion of the Public Switched Telephone Network (PSTN) 102.

The NIU 103 communicates with the Telemetry And Control (TAC) 101 hub equipment via the PSTN 102 facilities. The communication activity can be initiated by either the TAC 101 or the NIU 103. As far as the PSTN 102 is concerned, all of these calls are ordinary calls.

The TAC 101 hub consists of a conventional modem controlled by a computer to establish telephone links, via dial-up connections 111, 110 through the PSTN 102, to the NIU's 103.

The TAC's 101 can be linked up, by using similar or the same modems above, with the utility company's Control And Data processing (CAD) 104 equipment via either permanent links 106 or dial-up connections 111 and 105 through the PSTN 102, depending on the traffic amount.

The CAD 104 consists of a modem, controlled by a computer, for communication through telephone system to the TAC's 101. The computer in the CAD 104 may also have the ability to further process the data to generate billings to the customer and to issue service orders to the maintenance crew, etc.

The CAD 104 and TAC 101 equipment may sometimes be co-located in the same building. On the other hand, TAC's 101 of a large TRC system would best be distributed geographically so that most calls with the NIU's 103 will be local calls to save operational cost.

Among the components described above, all are commercially available except the NIU 103. Thus, only the construction of the NIU will be disclosed in some detail.

The proposed technique is realized by a special protocol prescribed below for the combinatorial logics implemented separately in the TAC 101 and the NIU 103 while operated in harmony.

Figure 2:
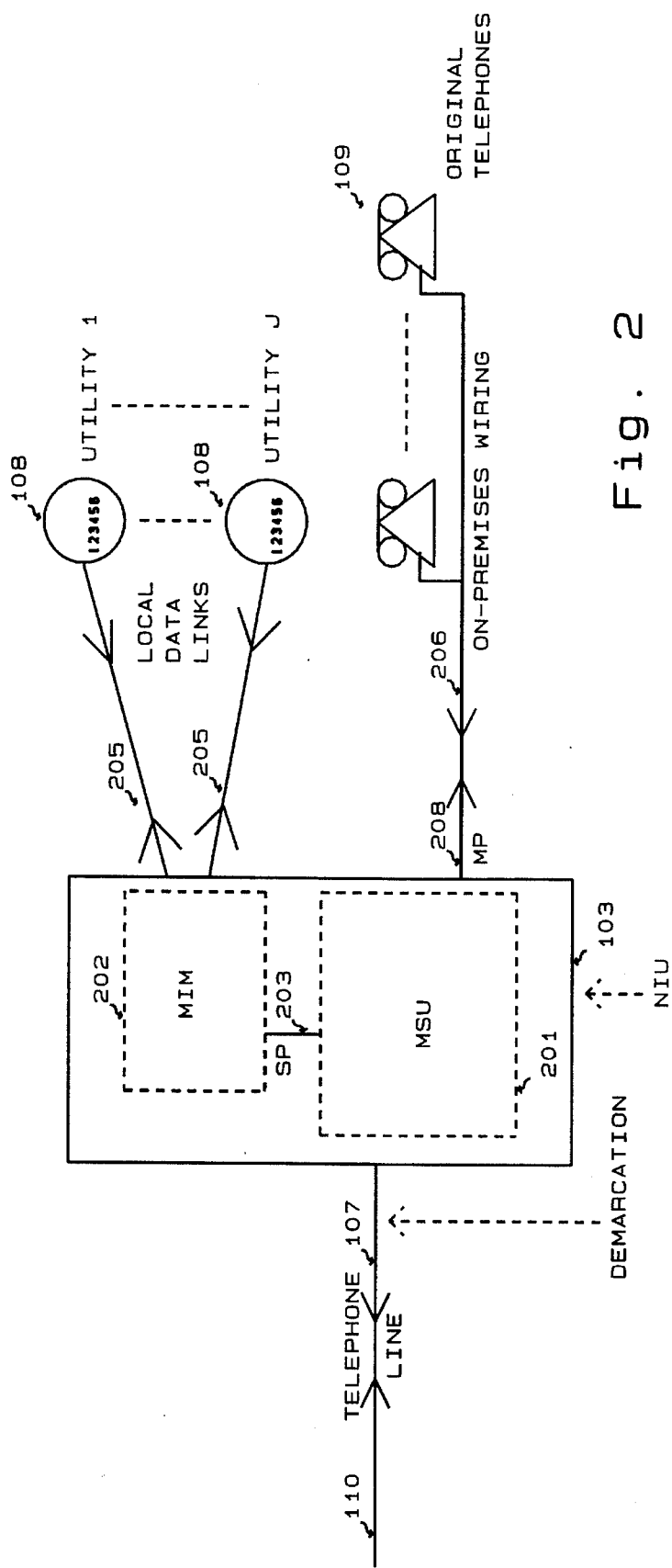
FIG. 2 is a block diagram of the NIU 103. It consists of the Master Switching Unit (MSU) 201 from U.S. Pat. No. 5,022,069 yet enhanced with new logic, and a specially designed modem called Meter Interface Module (MIM) 202. The MIM 202 is connected to one of the MSU's Secondary Ports (SP) 203 and functions as a telephone set with respect to the MSU 201. The MIM 202 communicates with local data terminals such as utility meters, power control units 108, etc. through data links 205. The on-premises wiring 206 that serves all of the original telephone instruments 109 is disconnected from the demarcation point 107 and then is re-connected to the Main Port (MP) 208 of the MSU.

FIG. 2 depicts a closer look of the NIU 103 at a typical customer site:

The NIU 103 is installed between the telephone line entry point (demarcation) 107 and the on-premises wiring 206 which connects to all original telephone instruments 109. NIU 103 is then connected through path 209 to demarcation 107.

The NIU 103 consists of the MSU 201 and the MIM 202.

The MIM 202 is an electronic modem that appears to be a telephone instrument to the MSU 201 through path 207. It has data links 205 to individual telemetry sensors and control units 108. These latter devices are well known products in their respective fields. Thus, they will be mentioned here only as references without detail discussion.

The MSU 201 is a single line PABX with built-in AA function. Its functions were fully disclosed in U.S. Pat. No. 5,022,069. Its enhanced characteristics will be described further in FIGS. 4 and 5 to provide a basic understanding of its contribution to the overall system operation.

Figure 3:
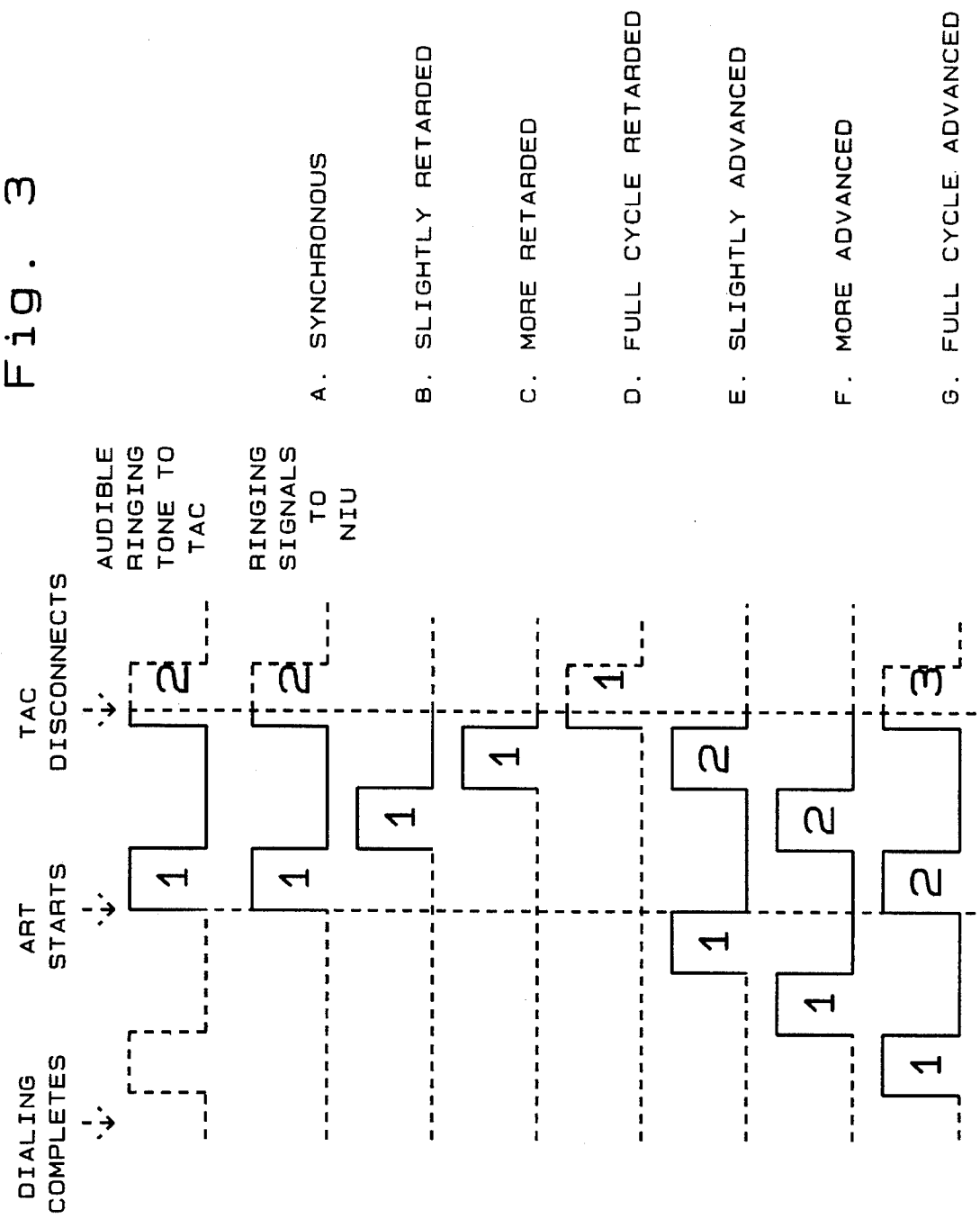
FIG. 3 is a timing diagram that depicts the relationship between the Audible Ringing Tone (ART) that is heard by the calling party (TAC) and the ringing signal that is applied towards the terminating party (NIU).

FIG. 3 depicts the relationship between the ART that the calling party hears and the actual ringing signals applied to the terminating party during a normal telephone call setup:

Conceptually, each time the calling party hears one cycle of the ART, there is one corresponding ringing signal applied to the called party. The telephone company has been successful in projecting this impression to the general public by the proper selection of the ART signal frequencies which mimic the sound of a bell.

In reality, the common equipment sharing techniques, employed by most telephone switching systems, dictate the ringing signals to be generated by an equipment that is separate from the one that generates the ART. Furthermore, because the ringing generators consume significant power, it is a common practice to group these generators in such a way that their "ON" cycles are offset from one another, to reduce the peak loading on the power supply system. For a ringing pattern having the silent period equal to twice of the period of actual ringing time, three groups of ringing signal generators are normally running simultaneously but each is offset from one another by one third of a cycle. This is commonly referred to as "phasing" the ringing signal generators. When the ringing signal is needed for a subscriber loop, one of these generators is called upon by the switching system processor. Thus, there is no guarantee whether the ringing signal would be in time synchronism with the ART. Modern Electronic Switching Systems (ESS) are capable of making these two in synchronism. However, it is to the telephone company's own protection not to utilize this feature, because this would allow certain information be exchanged between the two end parties even before the called subscriber answers.

The current invention will operate on the assumption that the ART may not be synchronous with the ringing signal. Even under this un-favorable situation, it can be shown that some information can still be exchanged between two pre-arranged end parties. This is why the protocol disclosed in this invention becomes useful. Consequently, the proposed system will work just as well when these two signals are in time synchronism.

Referring to FIG. 3, let's begin by specifying a rule that requires the calling party (TAC) 101 to listen for one cycle of ART initially. Upon hearing the beginning of the second ART cycle, TAC 101 terminates the call by hanging up the receiver. How many ringing signals would have been applied to the NIU 103 as a called party?

According to the "phasing" arrangement described above, the ringing signals applied to the NIU would be any one of four possible cases designated as A, B, C and D. That is, one full ring signal in all four cases plus a short portion of the second ring cycle for case A.

Case A shows that if the switching equipment is operating in a synchronous mode, the called party would hear one complete ring, then a partial second ring.

Case B shows that the ringing signal is turned on slightly behind the ART. The called party would hear only one complete ring. Then, the line becomes silent.

Case C shows that the ringing signal is further retarded from the ART. The called party will also hear one complete ring.

Case D shows that even if the ringing signal is one complete cycle behind the ART, the NIU 103 will still hear one partial ring. This is because the calling TAC 101 requests the PSTN 102 to disconnect the link after hearing the beginning of the second ART. By the time the terminating telephone office receives and executes this request, it would have started the first ringing cycle towards the NIU 103.

On the other hand, Cases E through G show that if the timing sequence between the ART and the ringing signal is reversed from the above, the called party may receive one ring even before the calling party begins to hear the first ART. For cases E and F, the called NIU 103 would have received two ringing signals before the calling TAC 101 disconnects.

Case G shows a very unlikely situation. The ringing signal is one full cycle in advance of the ART. In this case, the NIU 103 would have begun to hear the third ring when the TAC 101 abandons the call.

In the un-likely situation that Case G is encountered, the proposed technique below would allow the third partial ring to be passed through to sound the bell in the telephone instruments. However, this kind of rare "partial ringing associated with abandoned call" does exist in current PSTN 102 service, occasionally attributed to interference signal pickup on the telephone lines. When a subscriber answers to this kind of ringing signal, no one will be at the other end. The subscriber normally just hangs up the phone, while the calling party will not be charged.

Although the pre-screening process disclosed below could prolong the waiting period for one more ring to avoid this rare possibility, it would introduce one additional ringing cycle of delay as far as the calling party is concerned. To make the current invention easier to understand, we will begin with the assumption that Case G. is rare and would not adversely affect the proposed protocol. It will be shown later that if this is not the case, a small modification of the basic setup would take care of it.

The current invention will thus base on the assumption that if a caller disconnects the call immediately upon hearing the second ART, the called party instrument would have received only one or two ringing signal cycles. The MSU 201 in the NIU 103 will use this knowledge to treat the next caller as a TAC 101, if it calls within a certain time limit.

Figure 4:
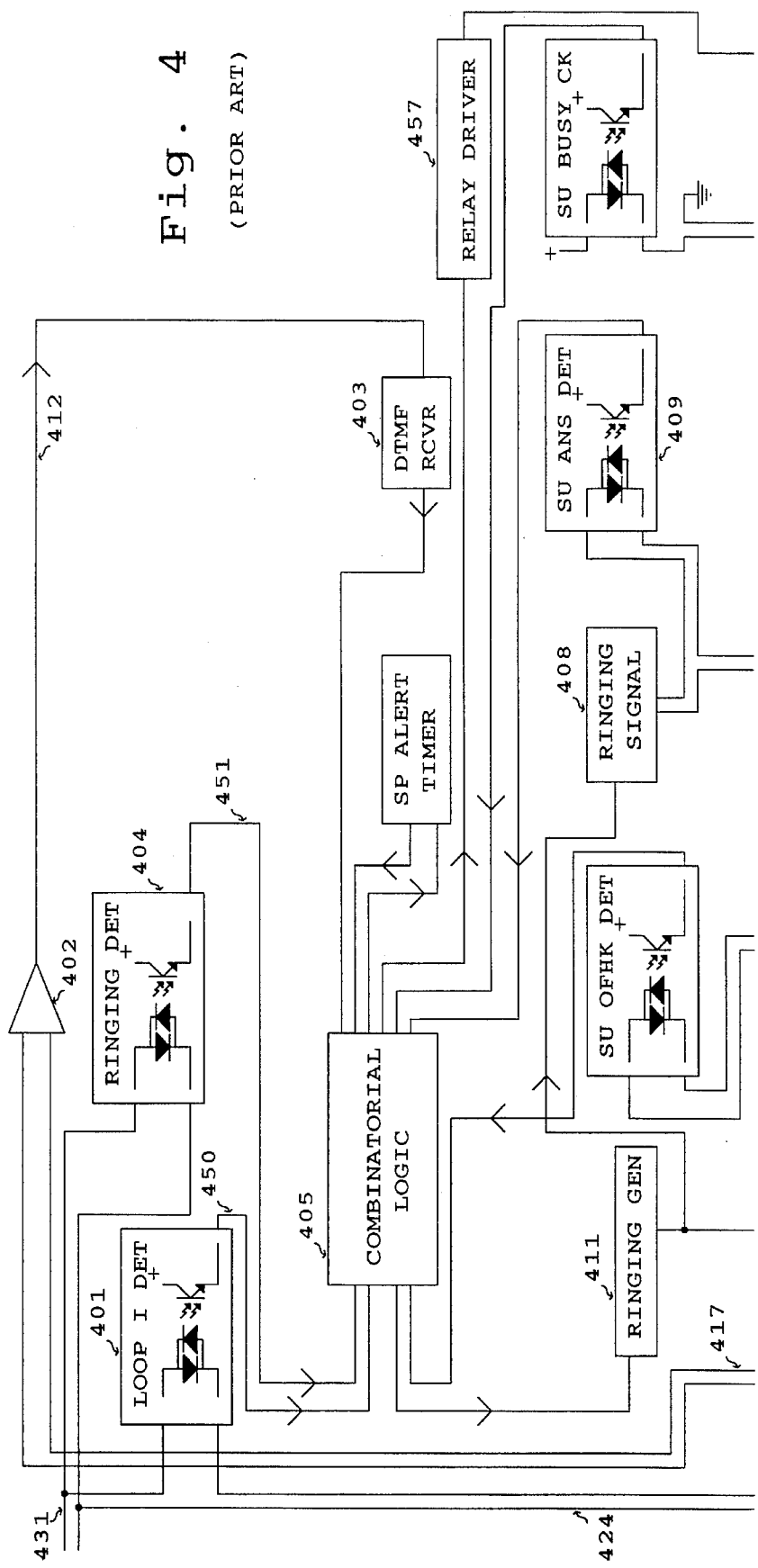
FIG. 4 and FIG. 5 are redrawn from FIG. 2 and FIG. 3, respectively, of U.S. Pat. No. 5,022,069. It demonstrates one possible physical implementation of the incoming call screening facility that is utilized to realize the TRC system.
Figure 5:
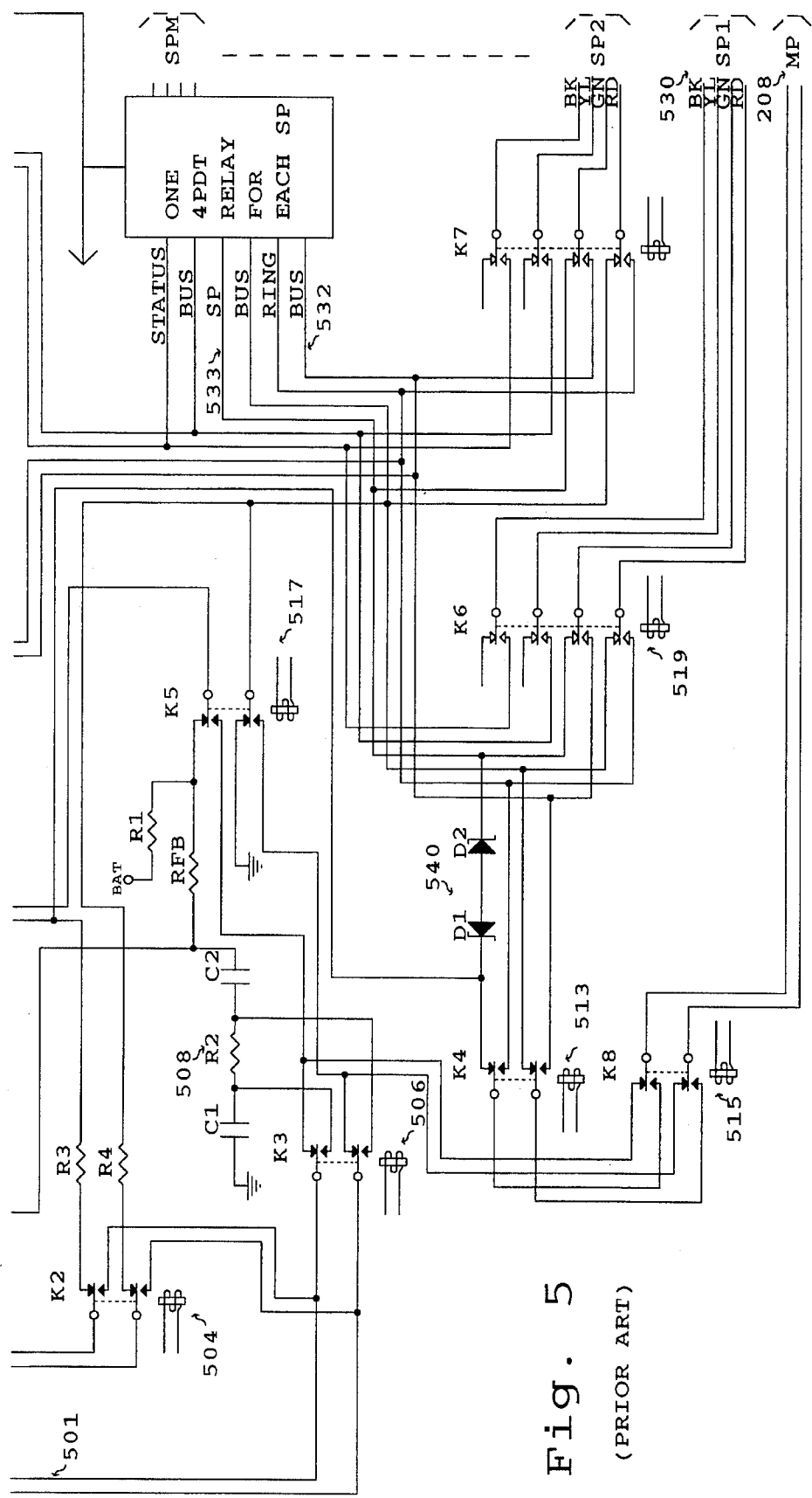

FIGS. 4 & 5 depict the MSU 201, 112 of U.S. Pat. No. 5,022,069. It is a single line Private Automatic Branch Exchange (PABX) with a built-in automated attendant function. Its function was fully disclosed in the above captioned patent. The following will only discuss the particular configuration that it is capable of formating, under the control of the enhanced combinatorial logic 405, which will be performing the pre-screening process needed in the current invention:

In the standby condition, Main Port MP 208, with all on-premises telephone instruments 109 connected is isolated from the outside telephone line, 431, by having relays K3 506, K4 513 and K5 517 released while K8 515 activated. Thus, the ringing signals from the telephone company will not be able to reach the MP 208, but only reaches the ringing det 404 which reports the event to the combinatorial logic 405 via conductor 451. Upon detecting proper sequence of events to be discussed below, the combinatorial logic 405 can command, through relay driver 457, relay K8 515 to release. This action connects MP 208 directly to the telephone company line at 431 through paths 424, 501 and relays K3 506, K8 515. Thus, the telephone company's ringing signal will be directly applied to MP 208. In other words, the ringing signals will be applied to the subscriber's original telephone instruments 109.

Up to this instant, the call has not being answered, as far as the telephone company is concerned. Consequently, an ordinary caller will not be charged by the telephone company even though the call has been pre-screened by the MSU 201. This is an essential feature in the current invention.

On the other hand, the combinatorial logic 405 may activate relay K3 506 to put outside line on hold by using the termination resistor R2 508 and activate relay K2 504 to make the DTMF receiver 403 ready for station selection digit from the caller through path 417, amplifier 402 and conductor 412. This is the automated attendant mode detailed in U.S. Pat. No. 5,022,069, allowing the TAC 101 to dial the DTMF digit specifying the address of SP 203, say SP1 530 where the MIM 202 is connected to. If the TAC 101 does this, combinatorial logic 405 activates relay K6 519, turns on ringing gen 411 to apply ringing signal via ringing signal 408, ring bus 532 and make contacts of relay K6 519 to SP1 530. When MIM 202 answers as reported by SU ANS DET 409, the call is routed to it by releasing relays K6 519, K3 506 and activating relay K5 517. Thus, the telephone instruments 109 on the premises connected to MP 208 do not receive any ringing signal during this call setup.

However, if the TAC 101 fails to select a SP 203 within a fixed amount of time, the MSU 201 will apply ringing signals, by activating ringing gen 411 and relay K4 513, toward the MP 208. So the subscriber will be alerted by the bells in the telephone instruments 109 which are now driven by the locally generated ringing signal 408.

A priority discriminator circuit 540, has been added to the SP bus feed 533 such that the stations on MP 208 will have higher priority than those on the SP port 530. Consequently, even if the TRC session through SP1 530 is in progress, a subscriber can easily interrupt such communication by simply lifting the receiver of the telephone set. There are many possible priority discriminators for this purpose. One of the most basic device is a Zener diode (D1, D2) pair, 540, that raises the minimum line voltage required to power the station instrument on SP1 530. Thus, the instrument on MP 208 can operate while those on the SP 203 can't when both are attempting to get service. With this, the subscriber can use the telephone line at any time as he or she wishes. The interrupted TRC session has to be repeated later which is relatively effortless because it is very straightforward in programming the TAC 101 to try contacting NIU 103 again upon a session failure.

Figure 6:
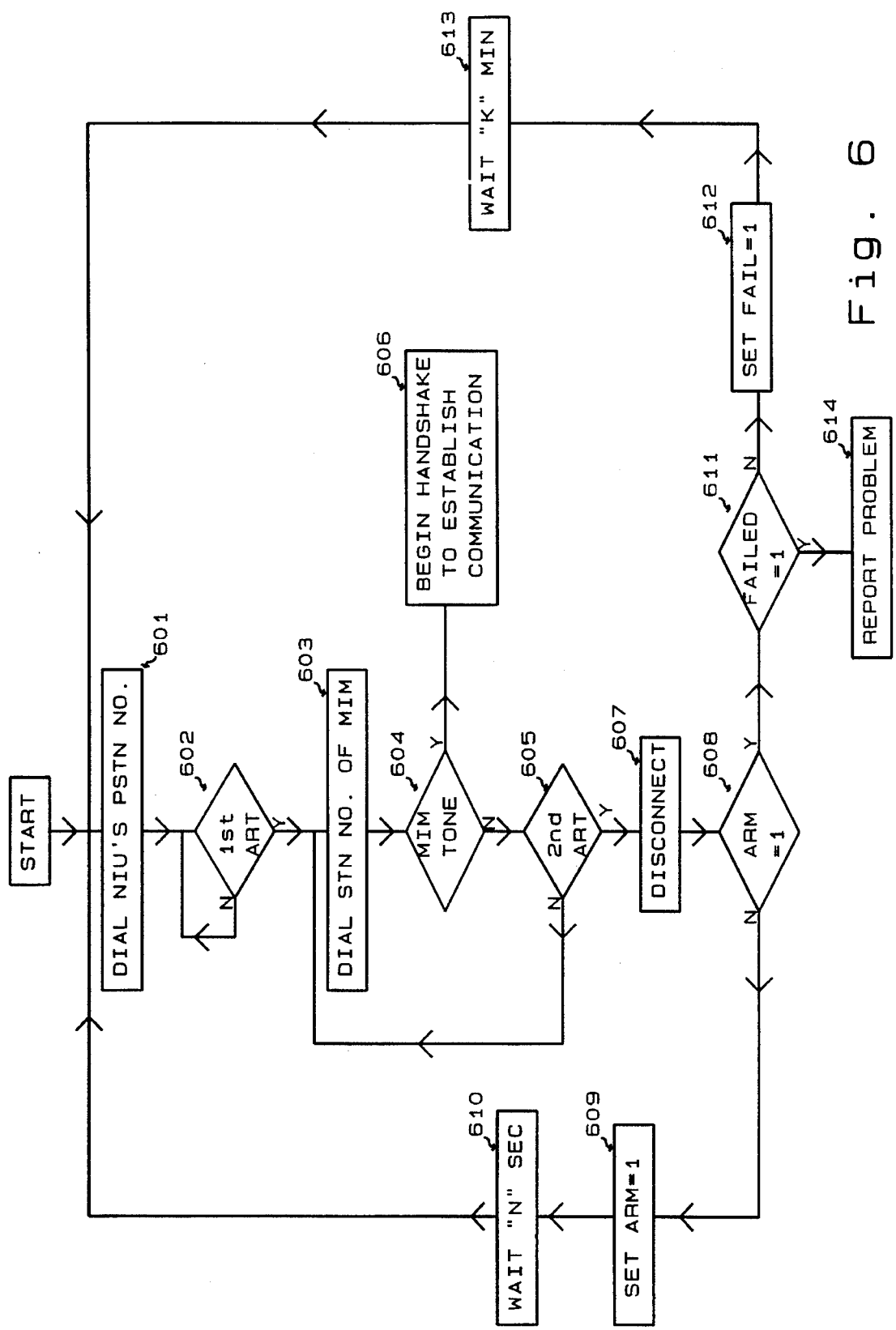
FIG. 6 is an operation flowchart showing one possible way of implementing the special calling sequence that the TAC 101 processor follows to identify itself when making an outbound call to an NIU 103.

FIG. 6 presents a possible operational sequence for the TAC 101. For each TRC call to a customer site, the TAC 101 makes at least two consecutive calls. The first one is designed to "wake up" or "arm" the NIU 103 by purposely disconnecting the link upon hearing the beginning of the second ART cycle. The second call should establish the connection with the MIM 202 through MSU 201, by utilizing its auto-attendant mode. If not, a re-try can be scheduled. The flowchart also suggests a methodology of reporting operation problems upon the second failure to establish communication, so that the difficulties can be diagnosed by the maintenance crew. The following is a detailed description of the logic flow:

To access a NIU 103, the TAC 101 begins with dialing the PSTN 102 number of the desired NIU (601). Then, upon hearing the first ART (602), the TAC 101 begins to cycle through three tasks;

A. Dial the station number of the MIM behind the MSU (603),

B. Listen for the initial response tone from the MIM (604),

C. Monitor for the beginning of the second ART (605).

Task A. is to instruct the MSU 201 to route the call to the desired MIM 202, in case it is in the automatic attendant mode of operation, due to prior un-intended signals on the telephone line 110 that have already "armed", it as explained below.

Task B. is to begin handshaking with the MIM 202 to establish communication (606) for the TRC operation, upon detecting its initial modem response tone (604).

Task C. indicates that, upon the detection of the second ART (605), the call should have progressed to the point of "arming" the NIU 103. This is the normally expected event during the first pass of a call from the TAC 101 to the NIU 103. Consequently, the TAC 101 disconnects from the line (607). Note that this "arming" process could be triggered by an abandoned call from an un-related caller, or telephone line noise transients.

Assuming the NIU 103 has not been "armed" before (608), then it will be armed by this process. Thus, the TAC 101 sets the "arm" register (609), waits for N seconds (610), then calls the NIU again. The value of N shall be at least slightly longer than the duration of one ringing cycle.

However, if the "arm" register is already marked (608), indicating that this is the second call and should have gotten MIM's 202 response, the "failed" register is checked (611). If it is not set, it will be set (612), and the TAC 101 waits K minutes (613), before making a new attempt to contact the NIU 103 again. The value of K should be long enough to allow ordinary voice call to be completed.

If the "fail" register is already set (611), indicating that this is the second time that the communication has been encountering difficulties. Report should be generated, (614), for the maintenance crew to look into the situation.

Figure 7:
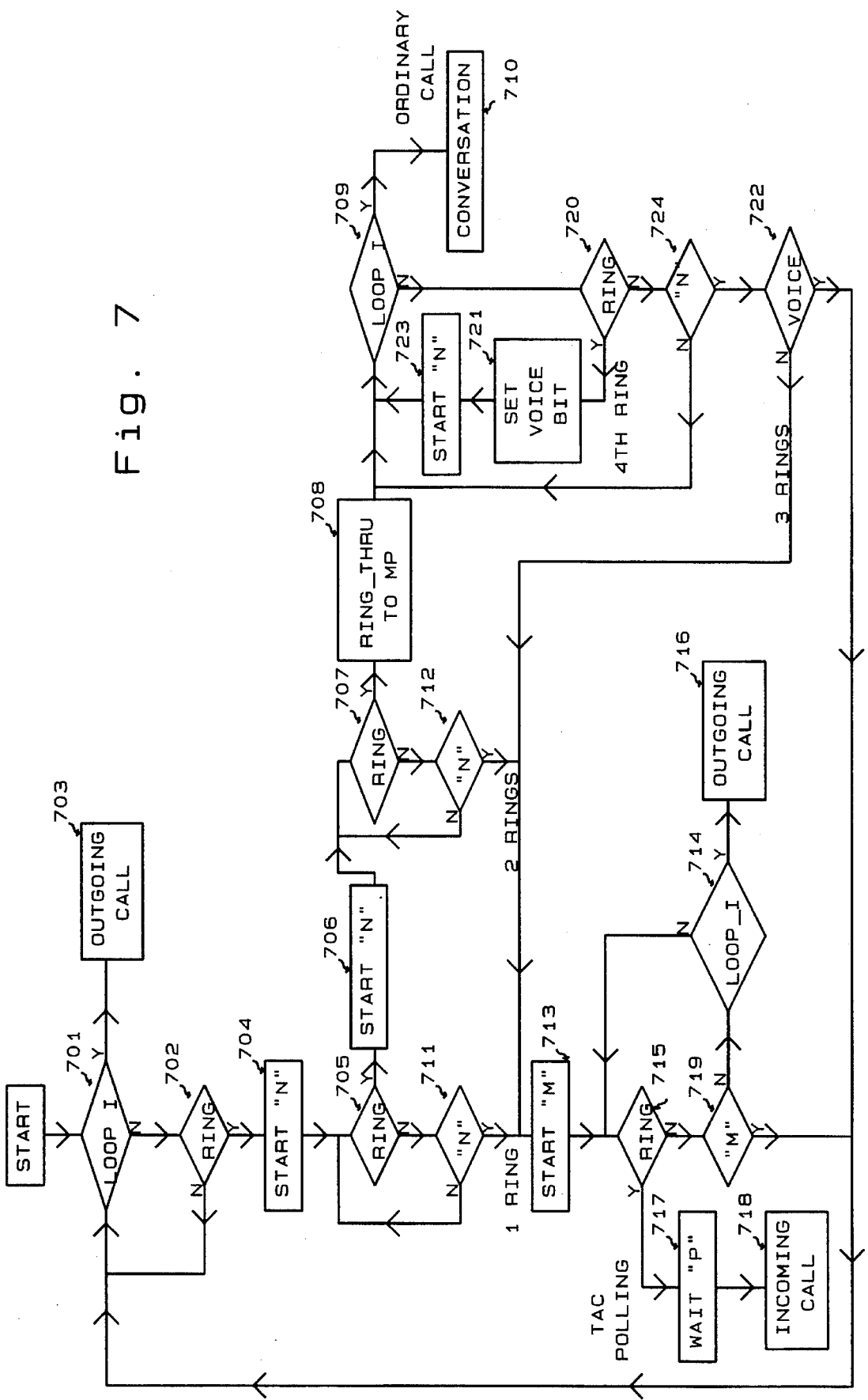
FIG. 7 presents a procedure of how the processor in the NIU 103 might analyze the ringing signals of an incoming call to distinguish the TRC calls from the ordinary calls.

FIG. 7 suggests how the MSU's 201 pre-screening process can distinguish an ordinary call from a TRC call. The basic rules are:

A. An ordinary caller will be connected through to the telephone instruments upon the third ringing signal from the telephone central office. From here on, the call proceeds as if the NIU 103 does not exist. It is important to note that because the caller pays the telephone company only after the call is answered by one of the telephone instruments 109, the only effect of blocking the first two ringings by MSU 201 is to delay the moment of answer.

B. A call that lasts only one to three ringing cycles without being answered will be regarded as the preamble of a polling call from the TAC 101. As a result, the MSU 201 is armed for the polling call from the TAC 101. The next call within a predetermined period of time will be processed through the automatic attendant branch of the MSU 201 logic as disclosed in U.S. Pat. No. 5,022,069. Because MSU 201 allows the selection of a station by receiving Dual Tone Multi Frequency (DTMF) codes from the calling party upon answering the incoming call, the TAC 101 will be connected to the MIM 202, instead of MP 208 to avoid triggering the bells in the telephone instruments 109.

The following is a step by step explanation:

The MSU 201 combinatorial logic 405 normally scans for loop I det 401 output signal 450, and ringing det 404 output signal 451.

If loop current is detected (701), the MSU 201 proceeds with the assumption that the subscriber is making an outgoing call (703).

If a ringing is detected (702), an "N" seconds timer is initiated (704). If a second ringing signal is detected within this period of time (705), the combinatorial logic 405 proceeds to restart the "N" seconds timer the second time (706). If a third ringing signal is detected within the period of this second timer (707) again, the combinatorial logic 405 commands the relays in MSU 201 to such a configuration to let the ringing signal to go through (708) to the subscriber's telephone sets 109 via MP 208. When one of the telephone sets 109 answers, indicated by loop I signal (709), the combinatorial logic 405 proceeds to the conversation state (710), essentially maintaining a transparent connection between the telephone line 110 and the station instrument 109.

However, if the incoming call ringing only persisted for one to three cycles without ever being answered (711, 712, or 722), the combinatorial logic 405 will "arm" itself by starting an "M" seconds timer (713). During this period of time, loop I det 401 and ringing det 404 are monitored. If loop current is detected (714), it is assumed that a subscriber has picked up the receiver and needs to make an outgoing call (716). If ringing is detected (715), the calling party is assumed to be the TAC 101. The MSU 201 waits "P" seconds (717), then proceeds into the automatic attendant mode (718) as described in U.S. Pat. No. 5,022,069. Under this condition, the call is routed to MIM 202 upon receiving DTMF selection signal from TAC 101.

If the "M" second timer runs out without detecting any activity (719), the MSU 201 goes back to its original idle loop at 701.

If the ringing signals continue onto the fourth cycle (720), or beyond, a "voice" bit is set (721) in the combinatorial logic 405 while a new timer of "N" seconds is started each time (723). Consequently, when ringing stops without being answered (724), the MSU 201 knows that it could not have been a data call from the TAC 101 but a voice call (722). So, the MSU 201 will return to the initial idle loop (701), directly.

In the illustrative embodiment of my invention, some specifics have been used to make the presentation more explicit. They should not be regarded as the limiting conditions or constraints on the invention.

For the purposes of illustration only, FIG. 6 suggests that TAC 101 reports problem upon second time of failure in contacting the NIU 103. In actual practice, it may be desirable to allow a few more attempts before declaring trouble conditions. That is, if the TRC session is conducted during the daytime hours instead of after midnight, there is a much greater chance to encounter interruptions due to the subscriber's use of the telephone line.

FIG. 3 is shown with an implication that the ringing cycle has a ratio of one unit on-time to two units off-time. Different switching systems may have different ratios. The relative counts of the ART and the ringing signals for the TRC purpose, however, may still be the same.

Furthermore, the inclusion of the MSU from U.S. Pat. No. 5,022,069 as part of the NIU 103 in the above presentation is for the convenience of explicitly illustrating the feasibility of the current invention. Many existing switching systems could be modified to provide the same function. Anyone familiar with the telephone switching systems would visualize that only a minor effort is required to modify some hardware and to partially re-program the software of many existing PABX's (Private Automatic Branch eXchange) or KTS' (Key Telephone System) such that the system behavior disclosed here can be achieved.

Instead of using a protocol that the actual polling occurs on the second call immediately following the "wake-up" call, it is possible to prescribe a sequence such that multiple consecutive "caller abandoned" calls, each last for only one to two ringing cycles and spaced by a finite time duration, can be used to identify the possibility of a call from the TAC 101. This can relax the timing requirement between the TRC calls to allow more flexibility in mixing TRC activities with other applications. Of course, this will make the overall time in accessing one customer much longer.

When my invention is used in the household by sharing the residential telephone line, an ordinary voice call will be delayed by two ringing cycles due to the pre-screening process of the NIU 103. This accounts for twelve seconds in the North American PSTN 102. This delay is judged not significant by the following analysis: Unlike in business office where a worker is normally next to the telephone, it usually takes quite a few ringing cycles before a residential subscriber would answer a call. Thus, the additional two ringing cycle delay will be transparent to an "un-informed" caller.

Note that for the ordinary callers, the response from the called party would seem to be a little slower than used to be, because the pre-screening ringing cycles are absorbed by the MSU 201. However, the caller does not pay for this time either, because as far as the PSTN 102 is concerned, the call has not been answered during this processing. As a matter of the fact, in many existing PBX and KTS systems there is one ringing cycle delay through the machines without any noticeable effect on the caller, primarily due to the fact that the caller can not sense such an event.

If desired, however, it is possible to configure the MSU 201 such that after each communication with the TAC 101, the MSU 201 can be instructed by TAC 101 to have the pre-screening process disabled for a certain duration, that is, releasing relays K3 506, K8 515 and ignoring any loop I det 401 or ringing det 404 activities. Thus, the MSU 201 will become transparent to ordinary telephone calls until this duration expires. From that moment on, it will provide the pre-screening function to ringing signals so that polling calls from the TAC 101 would not disturb the subscriber. That is, the MSU 201 will exhibit pre-screening behavior only during the period that the polling process is expected. In other words, the MSU 201 will be virtually non-existent as far as the regular callers are concerned for almost all the time.

With this capability implemented in the MSU 201, it will be simple to extend the pre-screening process by MSU 201 from two rings to three rings if it is necessary to avoid the third partial ring event mentioned earlier. Because, the extra ringing cycle delay would take effect for a finite duration only when the TAC 101 is expected to call.

A simple count-down timer can be used in implementing this capability. Its absolute accuracy is not critical because it is restarted each time a call is received from the TAC 101. Lastly, we will also let the MSU 201 to start up with pre-screening function each time it is powered-on. Thus, the incoming ringing delay will become effective after each power failure until the next communication from the TAC 101 is completed. These arrangements allow the use of simple circuitry in the NIU 103 as well as avoiding the need of backup batteries to run a calendar clock during commercial power failures.

It should be noted that the fundamental reason that the MSU 201 is capable of providing the feature as described by this invention is its ability to direct a call to two different destinations based on the protocol of the call. This is not possible currently on the ordinary subscriber loop 110 of the PSTN 102 because it has only one physical circuit. With the Integrated Service Digital Network (ISDN) capability becoming more accessible, the telephone company can treat a single subscriber loop as multiple circuits (with the upgrade of the terminal instruments), the protocol disclosed above can be implemented in the telephone company switching machine with some modification to fit the characteristics of the ISDN equipments.

There are many practical applications that can utilize the invention presented here:

As more and more electronics are imbedded into consumer products such as major appliances and automobiles, complexity in maintenance goes hand-in-hand with the improved performance. Meanwhile, it has become possible to carry out diagnosis by using a remote electronic instrument which is capable of "retrieving" historical performance record from the appliances. It follows that much of the repair shop waiting time can be reduced if the performance data of an appliance or an automobile can be remotely retrieved before hand for expert diagnosis. Then, the repair action can be scheduled with spare parts ready for replacement.

The protocol disclosed in this document can be used in simple one-to-one communications between data type instruments as well. As mentioned before, computer modem and facsimile transmission equipment sharing ordinary telephone line have used the FAX Switch to distinguish "data calls" from the voice calls. However, not only it is a specific solution for a specific type of equipment, it can only make the distinction after it has "answered" the call as far as the telephone company is concerned. Thus, a voice caller is forced to pay for this extra time unknowingly. The technique disclosed in this invention is of a generic nature. That is, to establish data communications, a calling subscriber would use a modem with capabilities similar to the TAC, and a called subscriber would use equipment similar to the NIU. It can avoid causing a voice caller to pay extra fee to the PSTN and can naturally replace the need of the special equipment such as the FAX switch.

The invention has been described with particular attention to its preferred embodiment. However, it should be understood that variations and modifications within the spirit and scope of the invention may occur to those skilled in the art to which the invention pertains.

What is claimed is:

1. A Network Interface Unit (103) comprising:

a master switching unit (201) comprising a central office port (209) for connection to a Public Switched Telephone Network (PSTN) (102) via a telephone line (110); a main port (208); at least one station port (203) assigned a local calling identity; and control means (405) for controlling the interconnection of said ports;

CHARACTERIZED IN THAT said control means (405) comprises means for establishing "standby" and "armed" states of said master switching unit; wherein said master switching unit switches from said "standby" state to said "armed" state in response to any one of a plurality of predefined sequences of normal power ringing signals received at said central office port (209) from said PSTN;

said control means (405), in the "standby" state, controls said switching unit to connect said central office port (209) to said main port (208) upon receipt of a sequence of normal power ringing signals other than one of said predefined sequences and;

said control means (405), in the "armed" state, controls said switching unit to connect said central office port (208) to said station port (203) upon receipt of a power ringing signal and thereafter receiving a DTMF signal corresponding to the local calling identity of said station port.

2. A Network Interface Unit (103) in accordance with claim 1:

CHARACTERIZED IN THAT said master switching unit, in the "armed" state, provides an "off-hook" signal to the PSTN; applies local power ringing to said main port (208) upon receipt of a power ringing signal without receipt of an immediately following DTMF signal corresponding to the calling identity of said station port; and connects said central office port (209) to said main port (208).

3. A Network Interface Unit (103) in accordance with claim 1:

CHARACTERIZED IN THAT said master switching unit, in the "armed" state, monitors said central office port (209) for receipt of a power ringing signal; and in the absence of receipt of power ringing within a predefined period of time after being set to the "armed" state, said master switching unit returns to the "standby" state.

* * * * *